(12) United States Patent
Pinney

(10) Patent No.: US 11,255,370 B2
(45) Date of Patent: Feb. 22, 2022

(54) CERAMIC FASTENER ASSEMBLY FOR HIGH TEMPERATURES

(71) Applicant: The Boeing Company, Chicago, IL (US)

(72) Inventor: Thomas R. Pinney, Chicago, IL (US)

(73) Assignee: The Boeing Company, Chicago, IL (US)

(*) Notice: Subject to any disclaimer, the term of this patent is extended or adjusted under 35 U.S.C. 154(b) by 267 days.

(21) Appl. No.: 16/590,267

(22) Filed: Oct. 1, 2019

(65) Prior Publication Data

US 2021/0095711 A1 Apr. 1, 2021

(51) Int. Cl.
*F16B 35/02* (2006.01)
*F16B 43/00* (2006.01)
*F16B 33/00* (2006.01)

(52) U.S. Cl.
CPC .......... *F16B 43/001* (2013.01); *F16B 33/006* (2013.01)

(58) Field of Classification Search
CPC .................................................. F16B 43/001
USPC .......................... 411/383–385, 900–902, 904
See application file for complete search history.

(56) References Cited

U.S. PATENT DOCUMENTS

| | | | | |
|---|---|---|---|---|
| 4,975,014 A | * | 12/1990 | Rutin | F16B 35/00 403/30 |
| 6,042,315 A | * | 3/2000 | Miller | F16B 19/00 411/383 |
| 6,045,310 A | * | 4/2000 | Miller | F16B 19/1036 411/356 |
| 7,827,694 B2 | * | 11/2010 | Soler | A61C 8/0018 29/896.1 |
| 7,988,395 B2 | * | 8/2011 | Steffier | F16B 3/00 411/385 |
| 8,388,295 B2 | * | 3/2013 | Kamiya | B60Q 1/045 411/508 |
| 8,602,782 B2 | * | 12/2013 | Lomicka | A61C 8/0006 433/174 |
| 9,732,632 B2 | * | 8/2017 | Twelves, Jr | F01D 25/265 |

* cited by examiner

Primary Examiner — Gary W Estremsky
(74) Attorney, Agent, or Firm — Duft & Bornsen, PC

(57) ABSTRACT

A ceramic fastener assembly for high temperatures. One embodiment is a fastener assembly that includes a ceramic fastener configured to engage a hole of a structure. The ceramic fastener includes a head and a non-threaded shank including one or more indentations around its perimeter. The fastener assembly also includes a sleeve configured to slide over the non-threaded shank of the ceramic fastener. The sleeve includes a hollow cylindrical body, an exterior surface with threads, and an interior surface with one or more protrusions configured to mate with the one or more indentations of the non-threaded shank. The fastener assembly further includes a nut configured to engage the threads of the sleeve to tighten the one or more protrusions with the one or more indentations of the non-threaded shank. The fastener assembly also includes a thermal spacer configured to thermally isolate the nut and the sleeve from the structure.

20 Claims, 8 Drawing Sheets

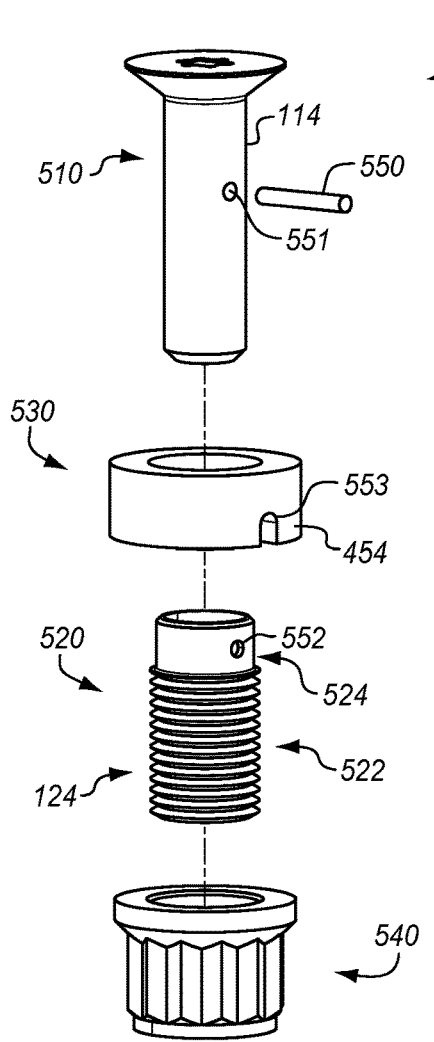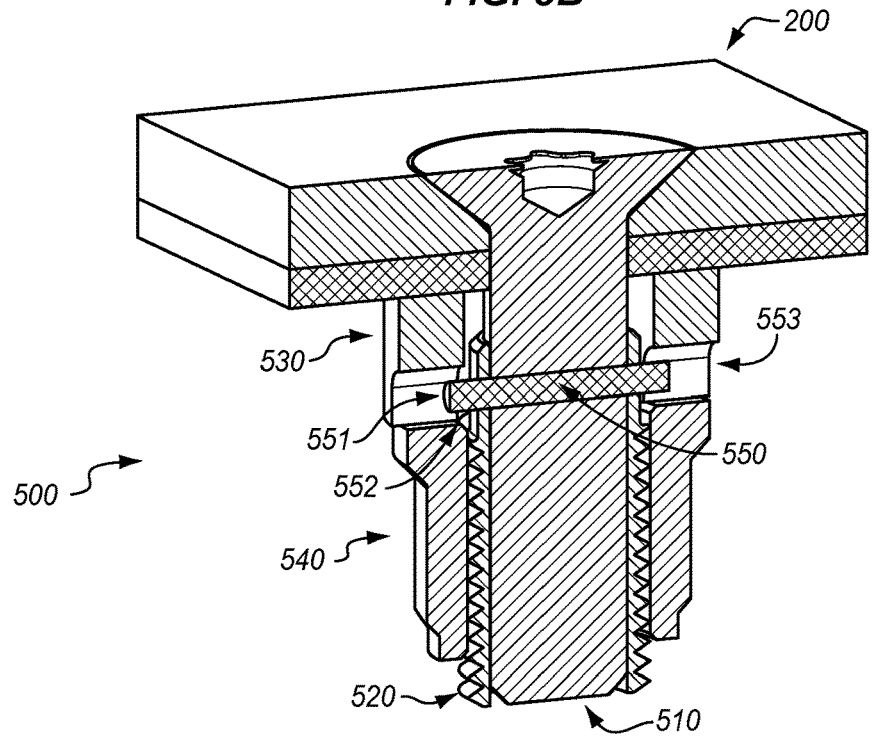

CERAMIC FASTENER ASSEMBLY FOR HIGH TEMPERATURES

FIELD

The disclosure relates to the field of fasteners, and in particular, to ceramic fasteners.

BACKGROUND

Fasteners are used in the aerospace industry to mechanically unite various structural components of an aircraft. Metal fasteners cannot be used for certain aerospace components such as hypersonic vehicle skins, exhaust ducts, and engine outlets because they are prone to degrade at high temperatures (e.g., 1,500 degrees Fahrenheit or more). Fasteners made of ceramic and Ceramic Matrix Composites (CMCs) are of interest due to their ability to resist degradation and corrosion at high temperatures. However, ceramic fasteners are expensive to manufacture and have limited strength.

SUMMARY

Embodiments described herein provide a ceramic fastener assembly for high temperatures. The fastener assembly includes a non-threaded ceramic fastener in conjunction with a threaded sleeve that is metal or plastic. After inserting the ceramic fastener into the structure, the metal sleeve slips over the shank of the ceramic fastener and couples with the shank. A nut made of metal or plastic is threaded onto the metal sleeve to clamp the fastener assembly to the structure. A thermal spacer is provided at the backside of the structure to insulate the metal/plastic sleeve and nut from high temperatures. Advantageously, the fastener assembly is able to resist high temperatures with ceramic material while also incorporating metal/plastic components that eliminate the difficult manufacturing process of machining threads in ceramic material. Moreover, the fastener assembly has improved clamp-up strength and fastener friction since the metal/plastic components may include deformed threads unlike conventional ceramic fasteners.

One embodiment is a fastener assembly that includes a ceramic fastener, a sleeve, a nut, and a thermal spacer. The ceramic fastener is configured to engage a hole of a structure. The ceramic fastener includes a head and a non-threaded shank with one or more indentations around its perimeter. The sleeve is configured to slide over the non-threaded shank of the ceramic fastener. The sleeve includes a hollow cylindrical body, an exterior surface with threads, and an interior surface with one or more protrusions configured to mate with the one or more indentations of the non-threaded shank. The nut is configured to engage the threads of the sleeve to tighten the one or more protrusions with the one or more indentations of the non-threaded shank. The thermal spacer is configured to thermally isolate the nut and the sleeve from the structure.

Another embodiment is a fastener assembly that includes a ceramic fastener, a sleeve, a nut, and a thermal spacer. The ceramic fastener is configured to engage a hole of a structure. The ceramic fastener includes a head and a non-threaded shank with one or more indentations around its perimeter. The sleeve is configured to slide over the non-threaded shank of the ceramic fastener. The sleeve includes a hollow cylindrical body, an exterior surface with threads, and an interior surface with one or more protrusions configured to mate with the one or more indentations of the non-threaded shank. The thermal spacer is configured to slip over the sleeve and constrain the one or more protrusions with the one or more indentations of the non-threaded shank. The nut is configured to engage the threads of the sleeve to tighten the thermal spacer against the structure.

Yet another embodiment is a fastener assembly that includes a ceramic fastener, a sleeve, a nut, a thermal spacer, and a pin. The ceramic fastener is configured to engage a hole of a structure. The ceramic fastener includes a head and a non-threaded shank including a first through-hole extending through a diameter of the non-threaded shank. The sleeve is configured to slide over the non-threaded shank of the ceramic fastener. The sleeve includes a hollow cylindrical body, an exterior surface with threads, and a second through-hole extending through a diameter of the sleeve that is configured to align with the first through-hole. The thermal spacer is configured to slip over the sleeve, and the nut is configured to engage the threads of the sleeve to tighten the thermal spacer against the structure. The pin is configured to insert through the second-through hole and the first through-hole to couple the sleeve to the non-threaded shank.

Other illustrative embodiments may be described below. The features, functions, and advantages that have been discussed can be achieved independently in various embodiments or may be combined in yet other embodiments further details of which can be seen with reference to the following description and drawings.

DESCRIPTION OF THE DRAWINGS

Some embodiments of the present disclosure are now described, by way of example only, and with reference to the accompanying drawings. The same reference number represents the same element or the same type of element on all drawings.

FIG. 5A is an exploded perspective view of a fastener assembly in another illustrative embodiment.

FIG. 5B is a side perspective view of the fastener assembly engaged with a structure in another illustrative embodiment.

DESCRIPTION

The figures and the following description illustrate specific illustrative embodiments of the disclosure. It will thus be appreciated that those skilled in the art will be able to devise various arrangements that, although not explicitly described or shown herein, embody the principles of the disclosure and are included within the scope of the disclosure. Furthermore, any examples described herein are intended to aid in understanding the principles of the disclosure, and are to be construed as being without limitation to such specifically recited examples and conditions. As a result, the disclosure is not limited to the specific embodiments or examples described below, but by the claims and their equivalents.

Figure 1:
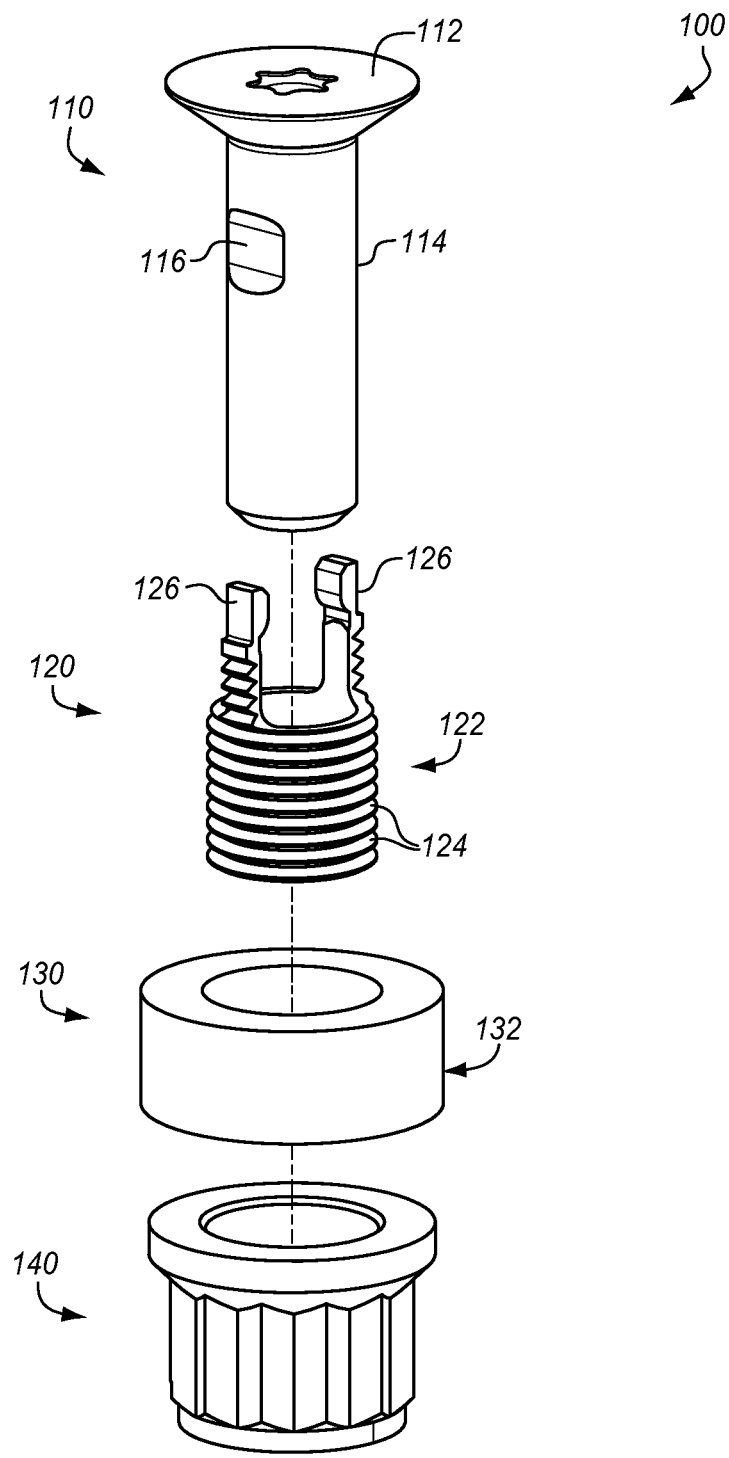
FIG. 1 is an exploded perspective view of a fastener assembly in an illustrative embodiment.

FIG. 1 is an exploded perspective view of a fastener assembly 100 in an illustrative embodiment. The fastener assembly 100 includes a ceramic fastener 110, a sleeve 120, a thermal spacer 130, and a nut 140. The ceramic fastener 110 includes a head 112 and a non-threaded shank 114 comprising a ceramic material to resist the corrosive effects of high temperatures. The thermal spacer 130 may also comprise a ceramic material. Examples of ceramic material include monolithic ceramic (e.g., silicon nitride) or ceramic matrix composites made from carbon/carbon (C/C), carbon/silicon-carbide (C/SiC), and monolithic short-fiber reinforced silicon nitride. By contrast, the sleeve 120 and nut 140 may comprise a non-ceramic material, such as metal or plastic. For example, the sleeve 120 and/or nut 140 may include a high-temperature metal (e.g., Inconel® 718, Haynes® 282, etc.) or a high-temperature plastic (e.g., Duratron® CU60 PBI).

Current high-temperature fasteners are generally made entirely of ceramic material and thus have several drawbacks. Namely, it is difficult and expensive to machine threads into ceramic material, and it is especially difficult to machine internal threads on a ceramic nut. Moreover, after machining external threads into a ceramic shank, the strength of the ceramic fastener is compromised due to stress concentrations that occur in the notches of the ceramic threads. Ceramic also does not allow for incorporating locking features such as deformed threads to increase thread friction. The result is that a conventional ceramic fastener, while having remarkable ability to withstand high temperatures, has limited ability to apply and maintain a high clamp-up tension on a structure.

The fastener assembly 100 addresses the above-described issues of ceramic fasteners while maintaining the ability to resist high temperatures. The non-threaded shank 114 of the ceramic fastener 110 includes one or more indentations 116 around its perimeter. The sleeve 120 is configured to slide over the non-threaded shank 114. The sleeve 120 includes a hollow cylindrical body 122, an exterior surface with threads 124, and one or more protrusions 126 configured to mate with or engage the one or more indentations 116. Accordingly, the sleeve 120 is configured to cover the non-threaded shank 114 and couple therewith by situating the protrusions 126 in the indentations 116.

The thermal spacer 130 includes a hollow circular body 132 and is configured to slide over the sleeve 120 and the non-threaded shank 114. The thermal spacer 130 protects the non-ceramic components, the sleeve 120 and the nut 140, from high temperatures. The nut 140 is configured to engage the threads 124 of the sleeve 120 to clamp against the thermal spacer 130 and fasten the fastener assembly 100 with a structure. Advantageously, the fastener assembly 100 is able to resist high temperatures with ceramic material (e.g., the ceramic fastener 110 and/or thermal spacer 130) while incorporating and protecting metal/plastic components (e.g., the sleeve 120 and/or nut 140) that eliminate the difficult manufacturing process of machining threads in ceramic material. By avoiding machined ceramic threads, the fastener assembly 100 provides a technical benefit in reducing fastener manufacturing cost, and increasing clamp-up strength through the elimination of stress concentrations along the axis of the non-threaded shank 114. Furthermore, unlike ceramic nut/threads, the sleeve 120 and nut 140 of the fastener assembly 100 may provide deformed threads that allow for applying and maintaining increased tension forces with a structure.

Figure 2:
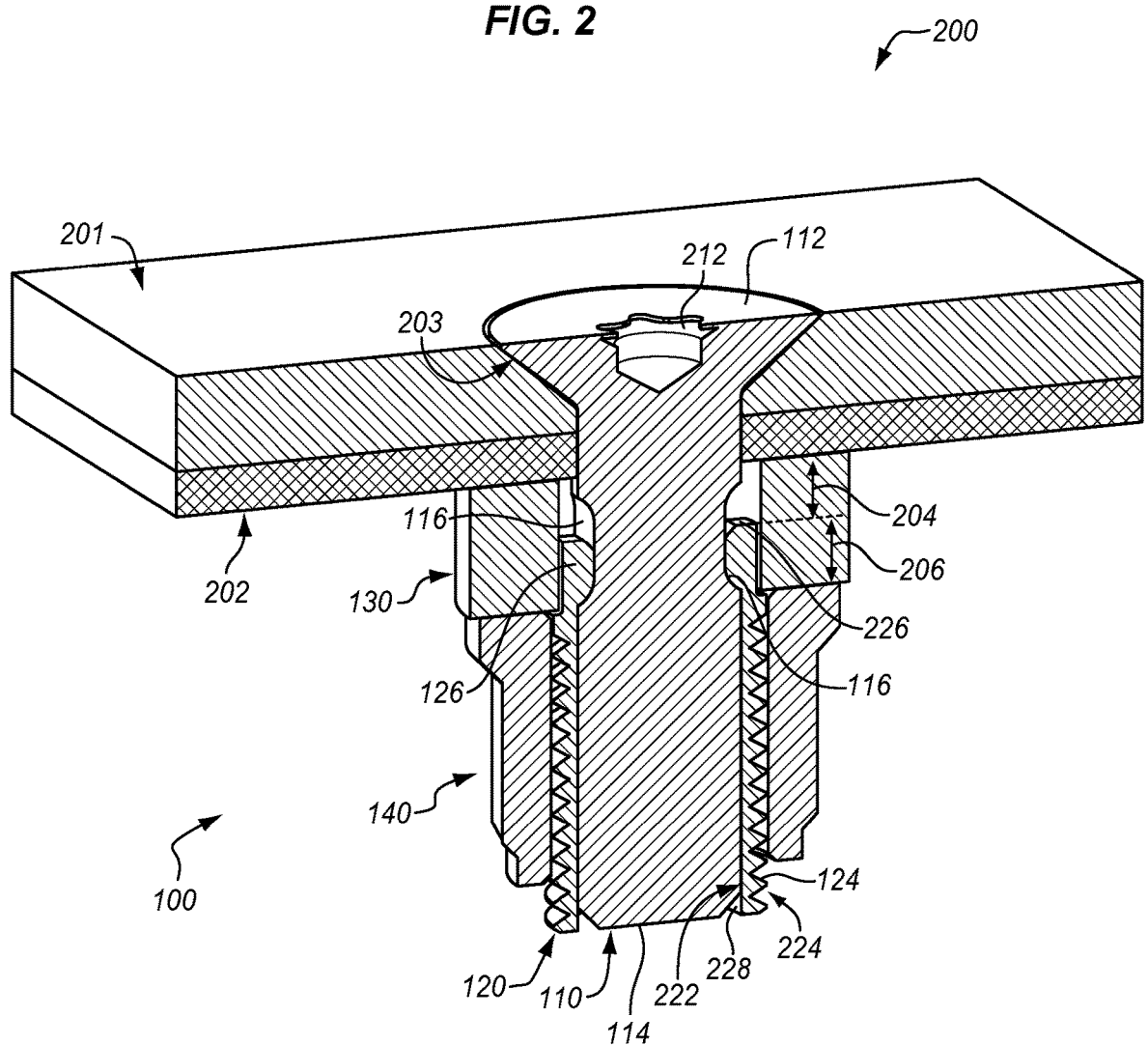
FIG. 2 is a side perspective view of the fastener assembly engaged with a structure in an illustrative embodiment.

FIG. 2 is a side perspective view of the fastener assembly 100 engaged with a structure 200 in an illustrative embodiment. The structure 200 includes a front surface 201, a back surface 202, and a hole 203. The ceramic fastener 110 is configured to engage the hole 203 for fastening the structure 200. That is, the non-threaded shank 114 is configured to insert through the hole 203, and the head 112 is configured to rest against and/or flush with the front surface 201 of the structure 200. The head 112 may include a driver slot 212 for driving the ceramic fastener 110 with a tool such as a screwdriver.

The one or more indentations 116 of the non-threaded shank 114 are disposed below the back surface 202 of the structure 200 as the head 112 rests with the front surface 201. This enables the sleeve 120 to slide onto the non-threaded shank 114 such that the protrusions 126 fit into respective indentations 116 with a space 204 between a top end 226 of the sleeve 120 and the back surface 202 of the structure 200. The space 204 provides a gap that prevents temperature flow from the structure 200 to the sleeve 120. The thermal spacer 130 may be disposed in and/or around the space 204 to thermally isolate the sleeve 120 from the structure 200. Additionally, the thermal spacer 130 may be disposed around an exposed portion 206 of the sleeve 120 that is between the nut 140 and the back surface 202 of the structure 200. The thermal spacer 130 is thus configured to thermally isolate the nut 140 and the sleeve 120 from the structure 200.

The sleeve 120 comprises an interior surface 222 that includes the protrusions 126 and an exterior surface 224 that includes the threads 124. Generally, the interior surface 222 of the sleeve 120 corresponds with a size and shape of the non-threaded shank 114. That is, with the protrusions 126 coupled with the indentations 116, the interior surface 222 may surround/contact the non-threaded shank 114 from the top end 226 to a bottom end 228 of the sleeve 120. As described in further detail below, the sleeve 120 may be configured to flex radially outward to fit/slide the protrusions 126 over the non-threaded shank 114 prior to reaching the indentations 116. In one embodiment, the protrusions 126 include semi-circular shaped tabs that extend radially inward from the interior surface 222 at or near the top end 226 of the sleeve 120 to fit into correspondingly shaped indentations 116 of the non-threaded shank 114.

Furthermore, in one embodiment, the nut 140 is configured to engage the threads 124 on the exterior surface 224 of the sleeve 120 to tighten the one or more protrusions 126 with the one or more indentations 116. That is, as the nut 140 translates axially up the sleeve 120 via the threads 124, the nut 140 may compress the exterior surface 224 of the sleeve 120 inward to press the protrusions 126 into the indentations 116 of the non-threaded shank 114. This further strengthens the connection of the sleeve 120 and the non-threaded shank 114 and allows the fastener assembly 100 to clamp the structure 200 with increased force. The rotating action of the nut 140 may also clamp the thermal spacer 130 against the back surface 202 of the structure 200. The structure 200 is thus fastened by the fastener assembly 100 with a clamping force between the head 112 and the thermal spacer 130.

Figure 3A:
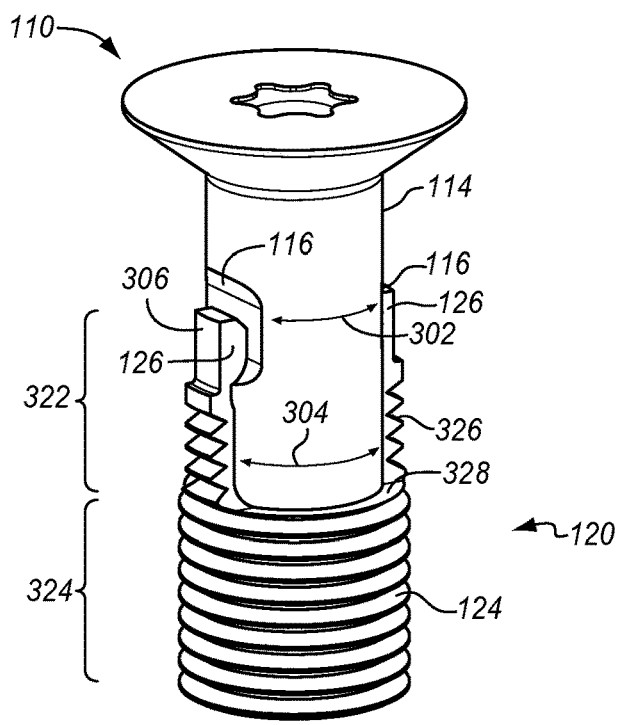
FIG. 3A is a perspective view of a ceramic fastener and sleeve in an illustrative embodiment.

FIG. 3A is a perspective view of the ceramic fastener 110 and sleeve 120 in an illustrative embodiment. In this example, the ceramic fastener 110 includes indentations 116 that are spaced around the perimeter of the non-threaded shank 114. That is, a non-indented portion 302 exists in a circumferential portion of the non-threaded shank 114 between the indentations 116. As shown in FIG. 3A, the indentations 116 may be formed on opposite sides of a perimeter of the non-threaded shank 114.

To fit with the ceramic fastener 110, the sleeve 120 may include an upper portion 322 and a lower portion 324. The upper portion 322 includes prongs 326 that slide over the non-threaded shank 114 and into the indentations 116. That is, the prongs 326 include respective protrusions 126 to couple with the indentations 116. The prongs 326 may also include circumferential gaps 304 therebetween that correspond with the non-indented portion 302 of the non-threaded shank 114. The prongs 326 and upper portion 322 of the sleeve 120 may therefore flex radially outward such that the sleeve 120 slips over the non-threaded shank 114 to engage the protrusions 126 with the indentations 116.

The lower portion 324 generally comprises a hollow cylindrical body with solid walls and threads 124 on its external surface. The upper portion 322, on the other hand, may form a hollow cylindrical body with circumferential gaps 304 between walls to form the prongs 326. In other words, the prongs 326 may extend axially from an upper rim 328 of the lower portion 324. At least a portion of the upper portion 322 may include the threads 124 on an external surface of the prongs 326 to enable the nut 140 (not shown) to translate up the sleeve 120 and compress the prongs 326, thereby tightening the protrusions 126 with the indentations 116. Additionally, upper external surfaces 306 of the prongs 326 may be disposed radially inward relative to the threads 124 to enable sliding the upper portion 322 under the thermal spacer 130 (not shown).

Figure 3B:
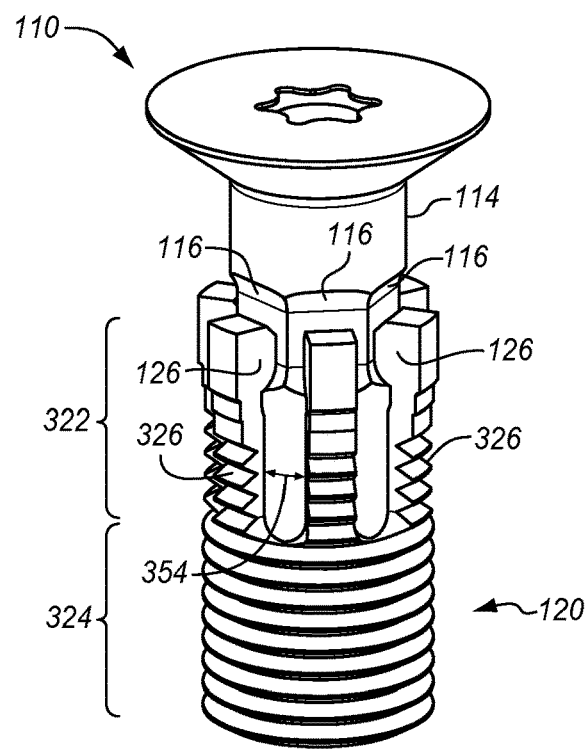
FIG. 3B is a perspective view of a ceramic fastener and sleeve in another illustrative embodiment.

FIG. 3B is a perspective view of the ceramic fastener 110 and sleeve 120 in another illustrative embodiment. In this example, the ceramic fastener 110 includes an increased number of indentations 116 around the perimeter of the non-threaded shank 114, and the indentations 116 are contiguous or at least have smaller gaps therebetween. Accordingly, the sleeve 120 may include a corresponding increased number of prongs 326 (e.g., six or more) to couple with the indentations 116, and the upper portion 322 of the sleeve 120 may include slits 354 or gaps between the prongs 326 that extend axially in the upper portion 322. The metal or plastic material of the sleeve 120 and the slits 354 in the upper portion 322 allow the prongs 326 to flex around the non-threaded shank 114 of the ceramic fastener 110.

An increased number of prongs 326 may provide a more uniform tension load on the ceramic fastener 110 and prevent slipping to allow fastening with higher levels of torque. Additionally, an increased number of connection points between the protrusions 126 and indentations 116 may allow a depth of the indentations 116 to be smaller to improve the strength of the non-threaded shank 114. However, the benefits of shallower indentations 116 may be weighed against the increased number of the indentations 116 carved in the non-threaded shank 114.

Figure 4:
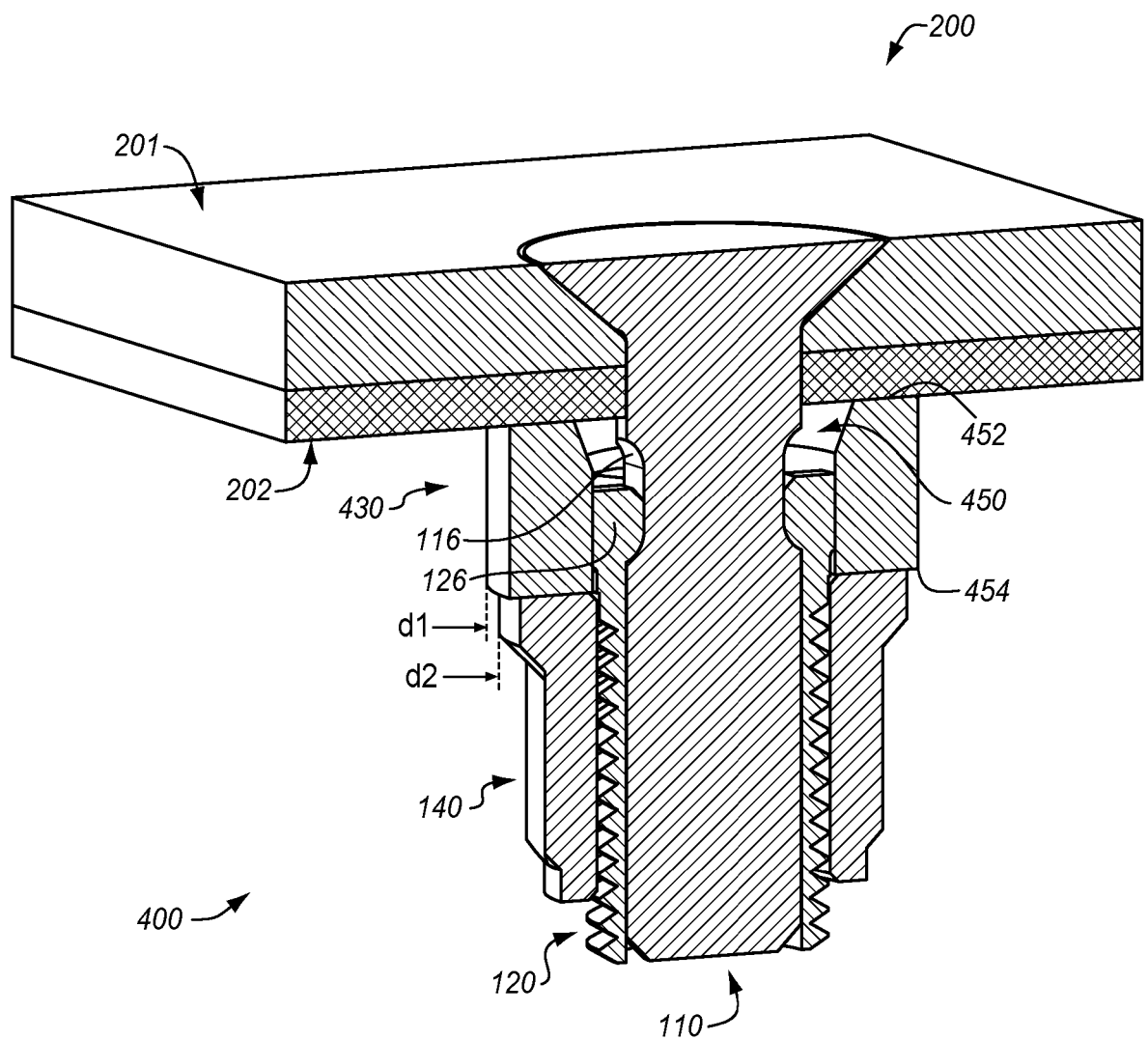
FIG. 4 is a side perspective view of a fastener assembly engaged with a structure in another illustrative embodiment.

FIG. 4 is a side perspective view of a fastener assembly 400 engaged with the structure 200 in another illustrative embodiment. In one embodiment, a thermal spacer 430 includes a chamfered collar 450 configured to slip over the sleeve 120 and lock the protrusions 126 in the indentations 116. That is, the thermal spacer 430 includes an inner opening having a larger diameter at the top end 452 which tapers to a smaller opening in an axial direction toward a bottom end 454 of the thermal spacer 430. The thermal spacer 430 thus tapers to press the one or more protrusions 126 with the one or more indentations 116 as the thermal spacer 430 slides over the sleeve 120. The nut 140 may constrain the thermal spacer 430 against the structure 200. As indicated by the dashed lines, the thermal spacer 430 may include an outer diameter d1 larger than an outer diameter d2 of the nut 140 to isolate the nut 140 from the structure 200.

FIG. 5A is an exploded perspective view of a fastener assembly 500 in another illustrative embodiment. The fastener assembly 500 includes a ceramic fastener 510, thermal spacer 530, sleeve 520, and nut 540. The fastener assembly 500 further includes a pin 550 configured to constrain the sleeve 120 to the ceramic fastener 510. This enables the sleeve 120 to couple with the ceramic fastener 510 without indentations in the non-threaded shank 114 or corresponding protrusions in the sleeve 520.

The ceramic fastener 510 includes a first through-hole 551 extending through a diameter of the non-threaded shank 114. The sleeve 520 includes a second through-hole 552 extending through a diameter of the sleeve 520 and configured to align with the first through-hole 551. The thermal spacer 530 may include one or more notches 553 in a surface of the bottom end 454 that aligns with the first through-hole 551 and second through-hole 552. The sleeve 520 may generally include a metal or plastic hollow cylindrical body including a lower portion 522 with threads 124 and an upper portion 524 without threads 124 to fit within the inner cylinder of the thermal spacer 530. The second through-hole 552 may extend radially across the upper portion 524 of the sleeve 520. The nut 540 includes internal threading to engage the threads 124 of the sleeve 520 and fasten the fastener assembly 500 with a structure.

FIG. 5B is a side perspective view of the fastener assembly 500 engaged with the structure 200 in another illustrative embodiment. As shown in FIG. 5B, the first through-hole 551, second through-hole 552, and notches 553 align with the fastener assembly 500 in an assembled state. The pin 550 is thus configured to insert through the thermal spacer 530, the sleeve 520, and the non-threaded shank 114. The length of the pin 550 is generally sized to extend across the diameter of the sleeve 520 to constrain the sleeve 520 in an axial direction with the non-threaded shank 114. The thermal spacer 530 is configured to thermally isolate the pin 550, the sleeve 520, and the nut 540 from the structure 200. In some embodiments, the pin 550 may include a cotter pin that provides a retention feature to prevent the pin 550 from moving after installation.

Figure 6A:
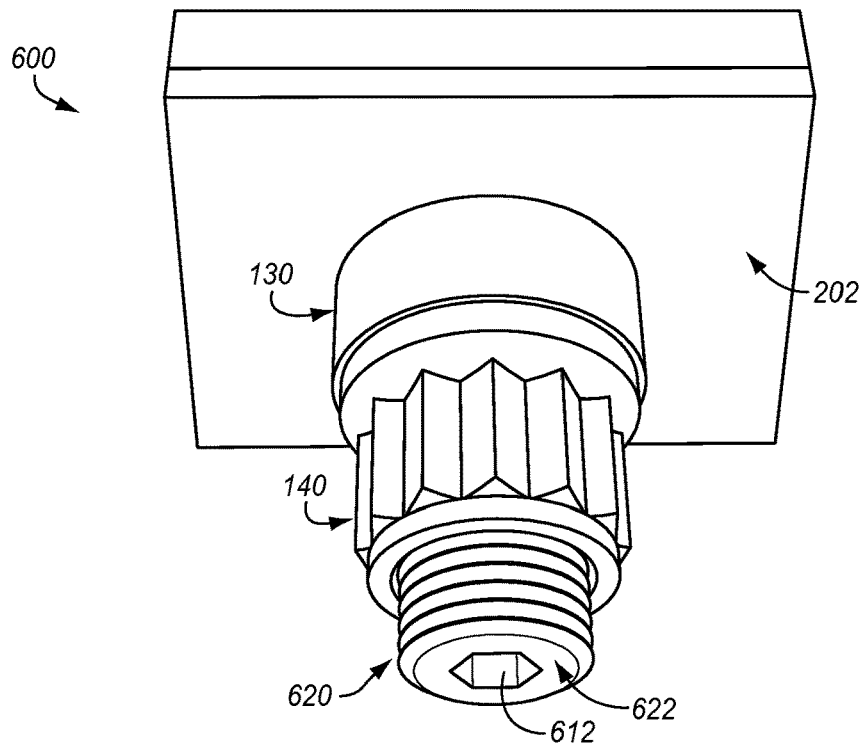
FIG. 6A is a bottom perspective view of a fastener assembly in an illustrative embodiment.
Figure 6B:
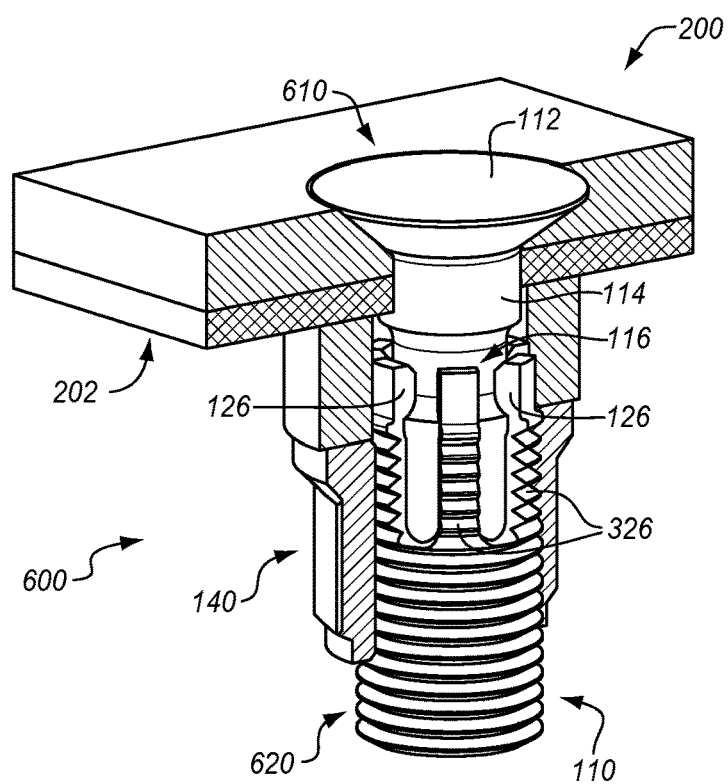
FIG. 6B is a side perspective view of the fastener assembly engaged with a structure in an illustrative embodiment.

FIG. 6A is a bottom perspective view of a fastener assembly 600 in an illustrative embodiment. FIG. 6B is a side perspective view of the fastener assembly 600 engaged with the structure 200 in an illustrative embodiment. In this embodiment, the sleeve 620 includes an enclosed bottom end 622 with a driver slot 612 for holding the sleeve 620 in place with a tool such as a screwdriver while the nut 140 is torqued. This allows applying torque to the fastener assembly 600 from a single side (e.g., at the back surface 202 of the structure 200). Moreover, since installation torque on the nut 140 may be reacted via the sleeve 620, a flow side wrenching recess (e.g., driver slot 212) may be avoided in the head 112 of the ceramic fastener 610 which may improve aerodynamics and prevent potential cracks in the ceramic fastener 610. Additionally, as shown in the example of FIG. 6B, the indentation 116 of the ceramic fastener 610 may comprise a continuous groove around a perimeter of the non-threaded shank 114, and the sleeve 620 may include a plurality of prongs 326 with indentations 116 at upper ends to engage the grooved perimeter of the non-threaded shank 114.

Figure 7A:
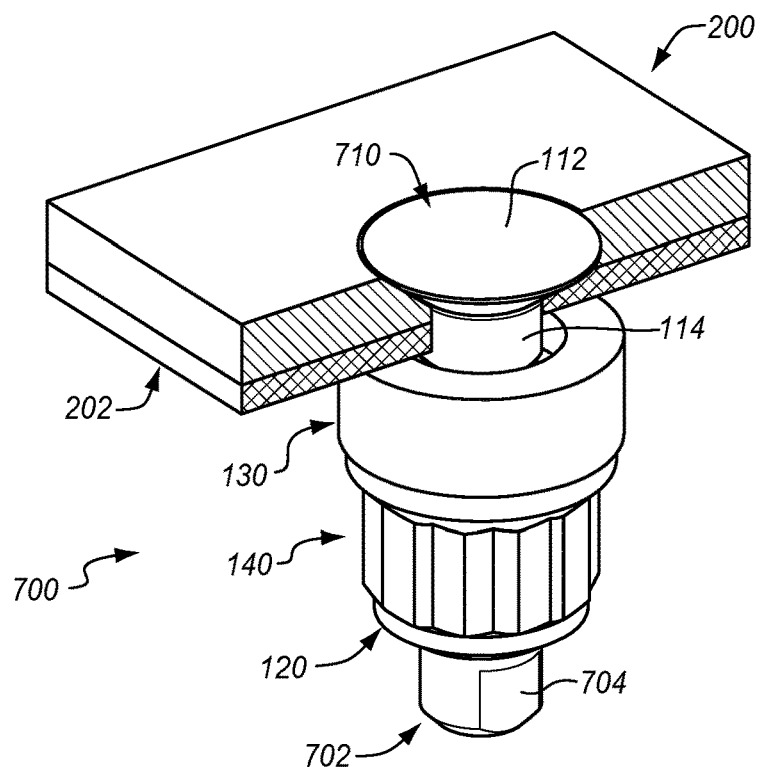
FIG. 7A is a perspective view of a fastener assembly engaged with a structure in another illustrative embodiment.
Figure 7B:
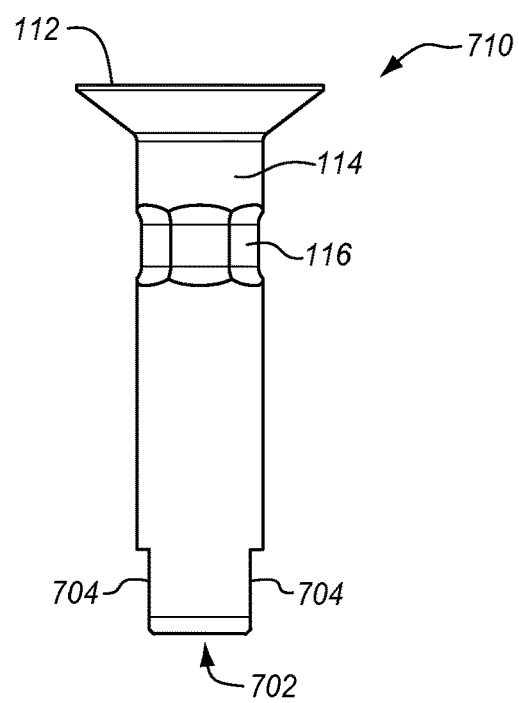
FIG. 7B is a side view of a ceramic fastener in another illustrative embodiment.

FIG. 7A is a perspective view of a fastener assembly 700 engaged with the structure 200 in another illustrative embodiment. FIG. 7B is a side view of a ceramic fastener 710 in another illustrative embodiment. In this embodiment, the ceramic fastener 710 includes a non-threaded shank 114 having a bottom end 702 with wrench flats 704. This allows applying torque to the fastener assembly 700 at a single side (e.g., at the back surface 202 of the structure 200). Moreover, since installation torque may be applied via the bottom end 702 of the ceramic fastener 710, a flow side wrenching recess (e.g., driver slot 212) may be avoided in the head 112 of the ceramic fastener 710 which may improve aerodynamics and prevent potential cracks in the ceramic fastener 710. Moreover, the ceramic fastener 710 may be easier to manufacture since no recess machining is necessary in the ceramic and the ceramic fastener 710 may have improved ability to apply installation torque.

Figure 8:
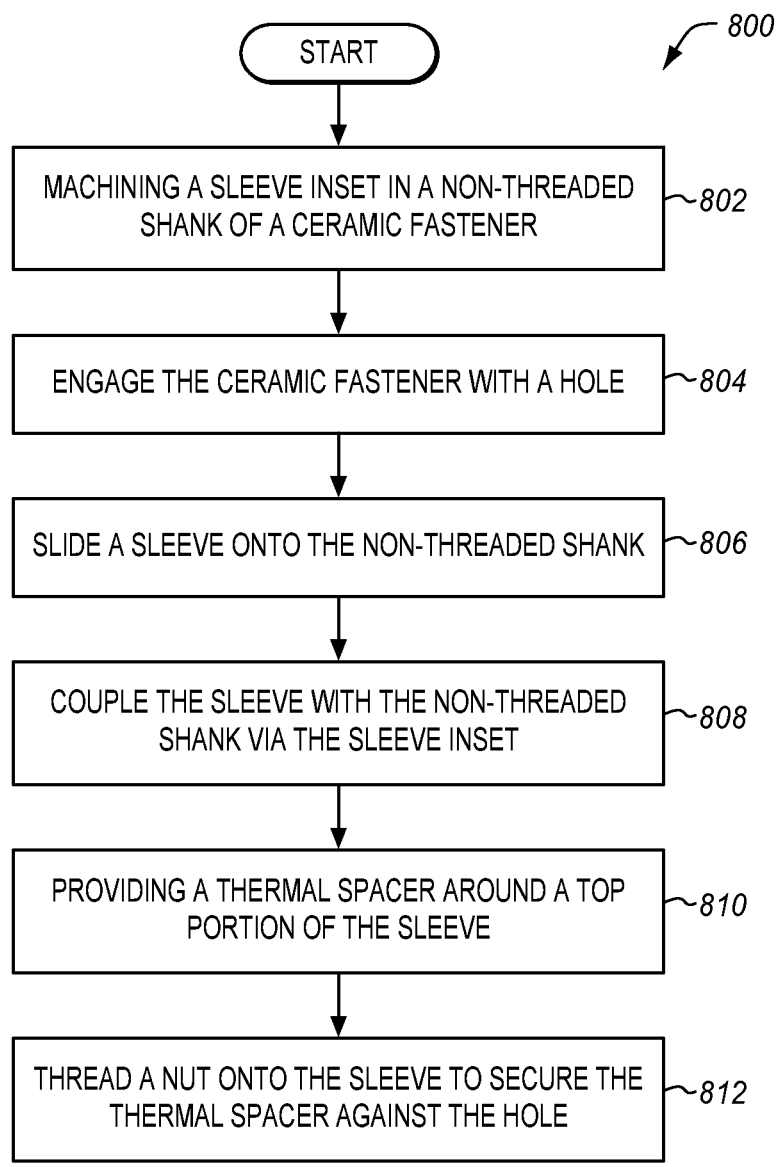
FIG. 8 is a flow chart illustrating a method of fastening a fastener assembly with a structure in an illustrative embodiment.

FIG. 8 is a flow chart illustrating a method 800 of fastening a fastener assembly with a structure in an illustrative embodiment. The steps of method 800 will be described with reference to FIGS. 1-7, but those skilled in the art will appreciate that method 800 may be performed with other fastener assemblies, structures, etc. The steps of this flow chart are not all inclusive and may include other steps not shown, and the steps may be performed in an alternative order.

In step 802, a sleeve inset is machined in a non-threaded shank 114 of a ceramic fastener 110. The sleeve inset may include one or more indentations 116 or the first throughhole 551. In step 804, the ceramic fastener 110 is engaged with the hole 203. In step 806, the sleeve 120 is slid onto the non-threaded shank 114. In step 808, the sleeve 120 is coupled with the non-threaded shank 114 via the sleeve inset. The sleeve 120 and the non-threaded shank 114 may be coupled via indentations 116 and protrusions 126, via the nut 140 configured to constrain indentations 116 and protrusions 126, via the thermal spacer 430 configured to constrain indentations 116 and protrusions 126, and/or via the pin 550 configured to constrain the sleeve 520 with the non-threaded shank 114.

In step 810, the thermal spacer 130 is provided around a top portion of the sleeve 120. And, in step 812, the nut 140 is threaded onto the sleeve 120 to secure the thermal spacer 130 against the hole 203. Accordingly, the method 800 provides a technical benefit in fastening a structure that may be subject to high temperatures with ceramic material (e.g., the ceramic fastener 110 and/or thermal spacer 130) while incorporating and protecting metal/plastic components (e.g., the sleeve 120 and/or nut 140) that eliminate the difficult manufacturing process of machining threads in ceramic material.

Although specific embodiments are described herein, the scope of the disclosure is not limited to those specific embodiments. The scope of the disclosure is defined by the following claims and any equivalents thereof.

What is claimed is:

1. A fastener assembly comprising:
   a ceramic fastener configured to engage a hole of a structure, the ceramic fastener comprising:
   a head; and
   a non-threaded cylindrical shank including one or more indentations around its perimeter;
   a sleeve configured to slide over the non-threaded cylindrical shank of the ceramic fastener, the sleeve comprising:
   a hollow cylindrical body;
   an exterior surface with threads; and
   an interior surface with one or more protrusions configured to mate with the one or more indentations of the non-threaded cylindrical shank, wherein the one or more protrusions include semi-circular shaped tabs that extend radially inward from the interior surface from a top end of the sleeve to fit into correspondingly shaped indentations of the non-threaded cylindrical shank;
   a nut configured to engage the threads of the sleeve to tighten the one or more protrusions with the one or more indentations of the non-threaded cylindrical shank; and
   a thermal spacer comprising a hollow circular body configured to slide over the sleeve, and to be axially clamped in engagement with the nut to thermally isolate the nut and the sleeve from the structure in an assembled state.

2. The fastener assembly of claim 1 wherein:
   the sleeve includes a metal or plastic material; and
   the sleeve includes one or more prongs on an upper portion that are configured to flex radially outward as the sleeve slips over the non-threaded cylindrical shank.

3. The fastener assembly of claim 2 wherein:
   the one or more prongs include the semi-circular shaped tabs.

4. The fastener assembly of claim 3 wherein:
   the one or more prongs are spaced via slits that extend axially in the upper portion of the sleeve.

5. The fastener assembly of claim 3 wherein:
   the upper portion includes the threads at an external surface of the prongs to enable the nut to compress the prongs and tighten the protrusions with the indentations.

6. The fastener assembly of claim 1 wherein:
   the head is configured to rest with a front surface of the structure;
   the one or more indentations of the non-threaded cylindrical shank are disposed below a back surface of the structure as the head rests with the front surface; and
   the thermal spacer is disposed around an exposed portion of the sleeve that is between the nut and the back surface of the structure.

7. The fastener assembly of claim 1 wherein:
   the one or more indentations are spaced around the perimeter of the non-threaded cylindrical shank, with non-indented portions between the indentations.

8. The fastener assembly of claim 1 wherein:
   the sleeve includes an enclosed bottom end with a driver slot for driving the sleeve with a tool.

9. The fastener assembly of claim 1 wherein:
   the non-threaded cylindrical shank includes a bottom end with wrench flats.

10. A fastener assembly comprising:
    a ceramic fastener configured to engage a hole of a structure, the ceramic fastener comprising:
    a head; and
    a non-threaded shank including one or more indentations around its perimeter;
    a sleeve configured to slide over the non-threaded shank of the ceramic fastener, the sleeve comprising:
    a hollow cylindrical body;

an exterior surface with threads; and an interior surface with one or more protrusions configured to mate with the one or more indentations of the non-threaded shank;

a thermal spacer configured to slip over the sleeve and constrain the one or more protrusions with the one or more indentations of the non-threaded shank, wherein the thermal spacer includes a chamfered collar that tapers to press the one or more protrusions with the one or more indentations as the thermal spacer slides over the sleeve; and a nut configured to engage the threads of the sleeve to tighten the thermal spacer against the structure.

11. The fastener assembly of claim 10 wherein:

the one or more indentations are spaced around the perimeter of the non-threaded shank, with non-indented portions between the indentations.

12. The fastener assembly of claim 10 wherein:

the sleeve includes a metal or plastic material;

the sleeve includes one or more prongs configured to flex radially outward as the sleeve slides over the non-threaded shank; and the one or more prongs include the one or more protrusions at an upper portion of the sleeve.

13. The fastener assembly of claim 10 wherein:

the head, the non-threaded shank, and the thermal spacer include a ceramic material; and the sleeve and the nut include a metal material.

14. The fastener assembly of claim 10 wherein:

the sleeve includes an enclosed bottom end with a driver slot for driving the sleeve with a tool.

15. A fastener assembly comprising:

a ceramic fastener configured to engage a hole of a structure, the ceramic fastener comprising:

a head; and a non-threaded shank including a first through-hole extending through a diameter of the non-threaded shank;

a sleeve configured to slide over the non-threaded shank of the ceramic fastener, the sleeve comprising:

a hollow cylindrical body;

an exterior surface with threads; and a second through-hole extending through a diameter of the sleeve and configured to align with the first through-hole;

a thermal spacer configured to slip over the sleeve, and includes one or more notches in a surface of a bottom end to align with the first through-hole and second through-hole;

a nut configured to engage the threads of the sleeve to tighten the thermal spacer against the structure; and a pin configured to insert through the notches, the second through-hole, and the first through-hole to couple the sleeve to the non-threaded shank.

16. The fastener assembly of claim 15 wherein:

the pin comprises a cotter pin having a retention feature.

17. The fastener assembly of claim 15 wherein:

the second through-hole extends radially across an upper portion of the sleeve.

18. The fastener assembly of claim 15 wherein:

the sleeve includes an enclosed bottom end with a driver slot for driving the sleeve with a tool.

19. The fastener assembly of claim 15 wherein:

the head, the non-threaded shank, and the thermal spacer include a ceramic material; and the sleeve and the nut include a metal material.

20. The fastener assembly of claim 15 wherein:

the thermal spacer is configured to thermally isolate the nut, the sleeve, and the pin from the structure.

* * * * *